(12) United States Patent
Dirumdam et al.

(10) Patent No.: US 12,345,213 B2
(45) Date of Patent: Jul. 1, 2025

(54) GAS SUPPLY SYSTEM FOR A GAS ENGINE OR DUAL-FUEL ENGINE AND METHOD FOR OPERATING THE SAME

(71) Applicant: MAN Energy Solutions SE, Augsburg (DE)

(72) Inventors: Björn Dirumdam, Ellgau (DE); Thomas Lindermayr, Motzenhofen (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 17/351,599

(22) Filed: Jun. 18, 2021

(65) Prior Publication Data

US 2021/0396187 A1    Dec. 23, 2021

(30) Foreign Application Priority Data

Jun. 19, 2020   (DE) ..................... 10 2020 116 222.7

(51) Int. Cl.
*F02D 19/06*   (2006.01)

(52) U.S. Cl.
CPC ..... F02D 19/0621 (2013.01); F02D 19/0628 (2013.01); F02D 19/0642 (2013.01); F02D 19/0681 (2013.01); *F02D 2200/0602* (2013.01)

(58) Field of Classification Search
CPC ............ F02D 19/0621; F02D 19/0681; F02D 19/0628; F02D 19/0642; F02M 21/0227
See application file for complete search history.

(56) References Cited

U.S. PATENT DOCUMENTS

| | | | | |
|---|---|---|---|---|
| 3,741,166 A | * | 6/1973 | Bailey | F23C 9/006 431/9 |
| 3,883,290 A | * | 5/1975 | Windelbandt | F24H 3/0488 431/168 |

(Continued)

FOREIGN PATENT DOCUMENTS

| | | | |
|---|---|---|---|
| CN | 203098108 U | * | 7/2013 |
| CN | 104100377 | | 10/2014 |

(Continued)

OTHER PUBLICATIONS

Office Action dated Feb. 5, 2021 issued in German Patent Application No. 10 2020 116 222.7.

(Continued)

*Primary Examiner* — Logan M Kraft
*Assistant Examiner* — Joshua Campbell
(74) *Attorney, Agent, or Firm* — COZEN O'CONNOR

(57) ABSTRACT

A gas supply system, having a gas regulating station for supplying an engine with gaseous fuel and a double-walled gas line extending from the gas regulating station to the engine, which comprises an inner and an outer pipe, in a gas fuel operating mode the inner pipe is flowed through by the gaseous fuel towards an engine-side end of the double-walled gas line, an inert gas purging line, and a first shut-off valve assigned to the inert gas purging line. In a purging mode inert gas can be fed to the outer pipe at the gas regulating station-side, which inert gas flows through the outer pipe in the direction of the engine-side end of the double-walled gas line, where it passes into the inner pipe and flows via the inner pipe towards the gas regulating station-side end of the double-walled gas line.

12 Claims, 3 Drawing Sheets

(56) References Cited

U.S. PATENT DOCUMENTS

| | | | | |
|---|---|---|---|---|
| 3,909,299 | A * | 9/1975 | Corrigan | C01B 3/48 422/198 |
| 4,012,904 | A * | 3/1977 | Nogle | F23R 3/34 60/737 |
| 4,304,549 | A * | 12/1981 | Pfau | F23C 7/06 165/909 |
| 4,570,686 | A * | 2/1986 | Devine | B67D 7/0488 141/286 |
| 4,601,275 | A * | 7/1986 | Weinand | F02M 69/044 123/456 |
| 4,722,708 | A * | 2/1988 | Baltz | F02M 37/0017 114/211 |
| 4,784,104 | A * | 11/1988 | Dimond | F02D 33/003 123/468 |
| 4,861,348 | A * | 8/1989 | Koyama | H01M 8/0631 422/204 |
| 4,955,409 | A * | 9/1990 | Tokuda | F02M 69/465 123/456 |
| 5,076,242 | A * | 12/1991 | Parker | F02M 69/462 123/468 |
| 5,632,253 | A * | 5/1997 | Paul | F02D 19/0676 123/531 |
| 6,123,112 | A * | 9/2000 | Wagner | F01D 9/065 138/148 |
| 6,494,190 | B1 * | 12/2002 | Cohen | F02D 19/0684 123/575 |
| 6,827,065 | B2 * | 12/2004 | Gottemoller | F02M 63/0225 123/456 |
| 8,205,765 | B2 * | 6/2012 | Gruenwald | F17C 11/007 137/511 |
| 8,733,324 | B2 * | 5/2014 | Blizard | F02M 53/02 123/468 |
| 2007/0000456 | A1 * | 1/2007 | Wong | F02D 19/105 123/27 GE |
| 2014/0245995 | A1 * | 9/2014 | Deliyski | F02D 19/0613 123/456 |
| 2014/0283788 | A1 | 9/2014 | Bleyer | |
| 2015/0267647 | A1 * | 9/2015 | Prunnbauer | F02M 21/0245 123/434 |
| 2015/0354520 | A1 * | 12/2015 | Bleyer | F02D 19/0621 123/445 |
| 2016/0348613 | A1 * | 12/2016 | Tuexen | F02M 21/023 |

FOREIGN PATENT DOCUMENTS

| | | | | |
|---|---|---|---|---|
| CN | 104251159 | | 12/2014 | |
| CN | 104929812 | | 9/2015 | |
| CN | 105275670 | | 1/2016 | |
| CN | 105863888 | | 8/2016 | |
| CN | 106194504 | | 12/2016 | |
| CN | 107387265 | | 11/2017 | |
| CN | 107850012 | | 3/2018 | |
| DE | 102013006301 | | 10/2014 | |
| DE | 102013006301 | A1 * | 10/2014 | F02M 21/0218 |
| DE | 102014004013 | B3 | 7/2015 | |
| DE | 102016001343 | | 9/2016 | |
| DE | 102015214563 | B3 | 12/2016 | |
| EP | 2518299 | | 10/2012 | |
| EP | 2589780 | | 5/2013 | |
| EP | 2818674 | | 12/2014 | |
| EP | 2952727 | | 12/2015 | |
| GB | 201718344 | | 12/2017 | |
| GB | 2568099 | | 5/2019 | |
| JP | 2016-173101 | | 9/2016 | |
| KR | 20160033900 | | 3/2016 | |
| KR | 20170011758 | | 2/2017 | |
| KR | 101908564 | B1 | 10/2018 | |
| WO | WO 2011/077715 | | 6/2011 | |
| WO | WO-2015104735 | A1 * | 7/2015 | F02M 21/02 |
| WO | WO 2016/031219 | | 3/2016 | |

OTHER PUBLICATIONS

Search Report dated Sep. 30, 2021 issued in European Patent Application No. 21 180 174.1.
Office Action dated Jan. 25, 2022 issued in German Patent Application No. 10 2020 116 222.7.
Office Action dated Oct. 11, 2023 issued in Chinese Patent Application No. 202110678292.4.
Office Action dated Apr. 1, 2024 issued in Japanese Patent Application No. 2021-101635.

* cited by examiner

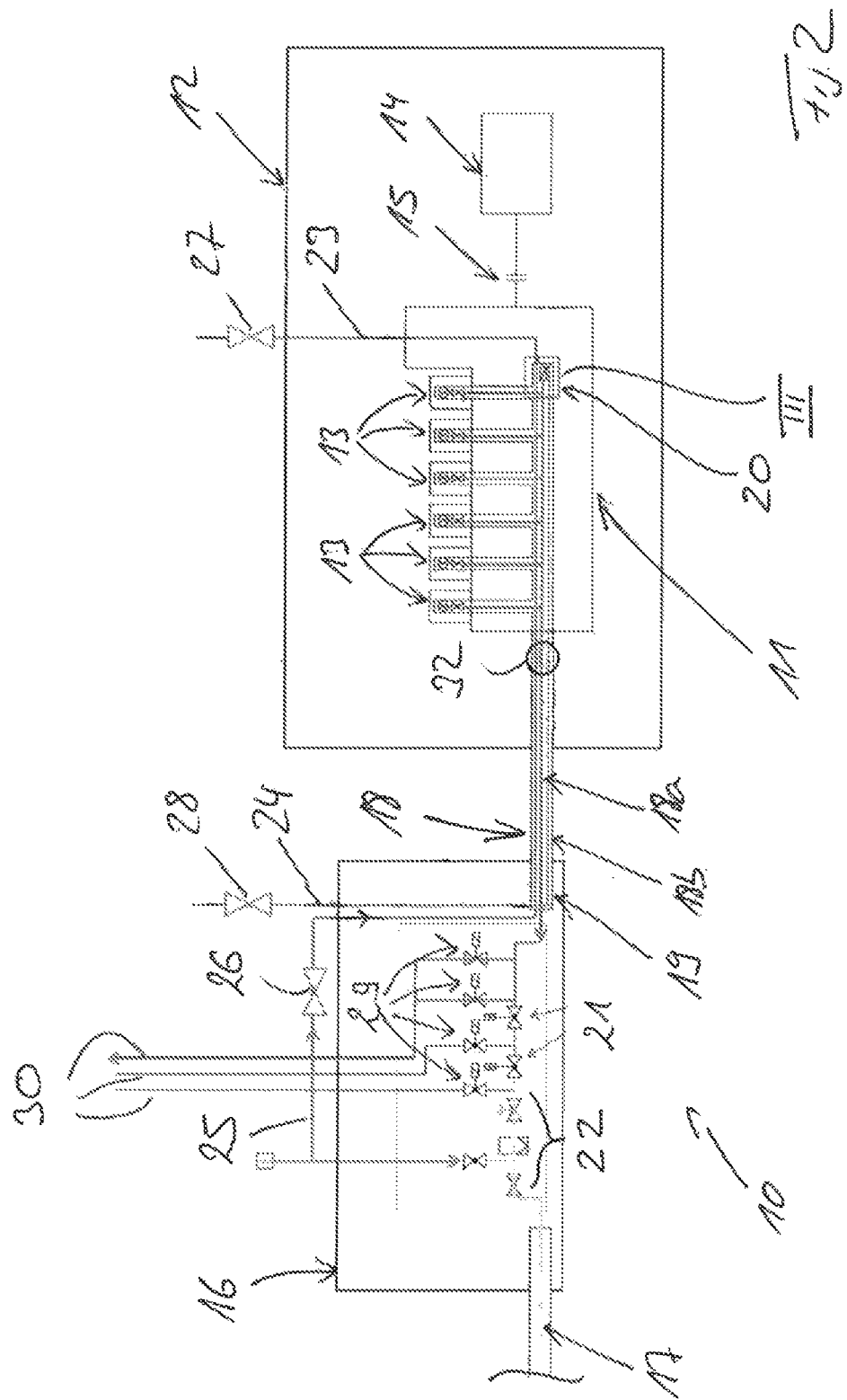

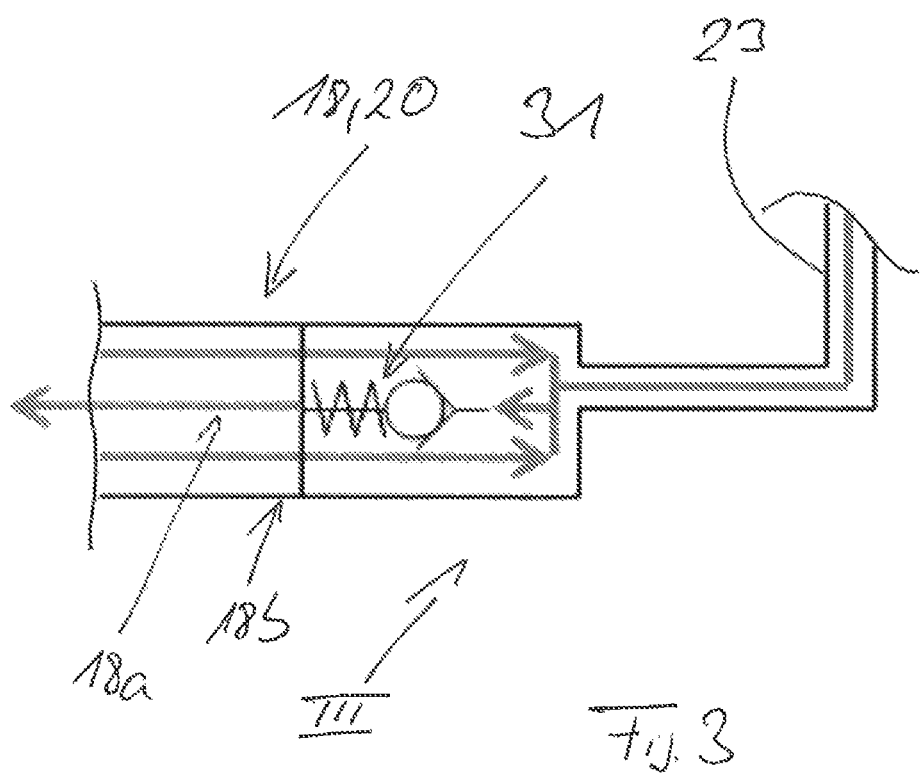

though the gas supply system comes into particular use in a dual-fuel engine.

GAS SUPPLY SYSTEM FOR A GAS ENGINE OR DUAL-FUEL ENGINE AND METHOD FOR OPERATING THE SAME

BACKGROUND OF INVENTION

1. Field of the Invention

The disclosure relates to a gas supply and inertisation system for a gas engine or dual-fuel engine. Furthermore, the invention relates to a method for operating the gas supply system.

2. Description of Related Art

In a gas engine as well as in a dual-fuel engine, a gaseous fuel is combusted as fuel in a gas fuel operating mode. By way of a gas supply system, the respective engine can be supplied with the gaseous fuel. Such a gas supply system comprises a tank for holding gaseous fuel and a gas regulating station for supplying the engine with gaseous fuel of a constant gas pressure as a function of a requested engine output and via a double-walled gas line extending from the gas regulating station to the cylinders of the engine.

The double-walled gas line of the gas supply and inertisation system comprises an inner pipe flowed through in the direction of the engine for the gas supply of the engine. Furthermore, the double-walled gas line of the gas supply system comprises an outer pipe, which at least partly surrounds the inner pipe and which is flowed through in the direction of the gas regulating station for discharging a potential gas leakage with the help of purge air. The inner pipe and outer pipe define a leakage flow passage that is flowed through by the purge air in the counter-flow direction to the inner pipe.

The gas regulating station of such a gas supply system is also referred to as GVU space.

During a purging operation of the gas engine and in particular when a dual-fuel engine is switched over from the gas fuel operating mode to a liquid fuel operation mode it is required to purge the lines previously conducting the gaseous fuel with inert gas. For this purpose, an elaborate piping of inert gas purging lines in the region of the engine are required in engines known from practice. This is disadvantageous.

SUMMARY OF THE INVENTION

There is therefore a need for a gas supply system for a gas engine or a dual-fuel engine in which it is possible to purge the pipes conducting the gaseous fuel with inert gas, namely with little structural expenditure, without the necessity of an elaborate pipe of an inert gas purging line in the region of the engine. Starting out from this, one aspect of the invention is based on a new type of gas supply system for a gas engine or dual fuel engine and method for operating the same.

The gas supply system according to one aspect of the invention comprises a gas regulating station that serves for supplying the engine in a gas fuel operating mode of the same with a gaseous fuel of constant gas pressure as a function of a requested engine output.

Furthermore, the gas supply system according to one aspect of the invention comprises a double-walled gas line extending from the gas regulating station to the cylinders of the engine, which comprises an inner pipe and an outer pipe surrounding the inner pipe at least in sections, wherein in the gas fuel operating mode the inner pipe of the double-walled gas line, emanating from a gas regulating station-side end of the double-walled gas line can be flowed through by the gaseous fuel in the direction of an engine-side end of the double-walled gas line.

The gas supply system according to one aspect of the invention, furthermore, comprises an inert gas purging line and a shut-off valve assigned to the inert purging line, wherein in a purging mode of the engine with opened first shut-off valve inert gas can be fed, via the inert gas purging line, to the outer pipe of the double-walled gas line at the gas regulating station-side end of the double-walled gas line, which inert gas flows through the outer pipe in the direction of the engine-side end of the double-walled gas line, there passes into the inner pipe and, via the inner pipe, flows back in the direction of the gas regulating station-side end of the double-walled gas line in order to exit there from the same.

With the invention present here a gas supply system is proposed in which the double-walled gas line, whose inner pipe is flowed through by gaseous fuel in the gas fuel operating mode, can be supplied with inert gas in the purging mode via the gas regulating station-side end of the double-walled gas line, which inert gas initially flows via the outer pipe, passes in the region of the engine-side end from the outer pipe into the inner pipe, then flows back via the inner pipe in the direction of the gas regulating station-side end, in order to be discharged from there. By way of this it is possible to do without an elaborate piping of an inert gas purging line in the region of the engine that was required in the past.

According to an advantageous further development of the invention, a valve is provided at the engine-side end of the double-walled gas line, which valve in the purging mode of the engine allows a passing of the inert gas from the outer pipe of the double-walled gas line into the inner pipe of the double-walled gas line. By way of this valve it can be ensured that on the one hand in the purging mode of the engine the passing of the inert gas from the outer pipe into the inner pipe is possible and on the other hand in the gas mode the passing of the fuel gases from the inner pipe into the outer pipe is prevented. This valve can be for example a non-return valve or an actively switchable valve.

According to an advantageous further development, a pressure sensor is connected to the double-walled gas line via which a pressure drop of a double-walled gas line filled with inert gas is detectable. By way of this, a leakage test for the double-walled gas line can be easily and reliably realised.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

FIG. 2 is the gas supply system in a second state; and

FIG. 3 is detail III of FIG. 2.

DETAILED DESCRIPTION OF THE PRESENTLY PREFERRED EMBODIMENTS

Figure 1:
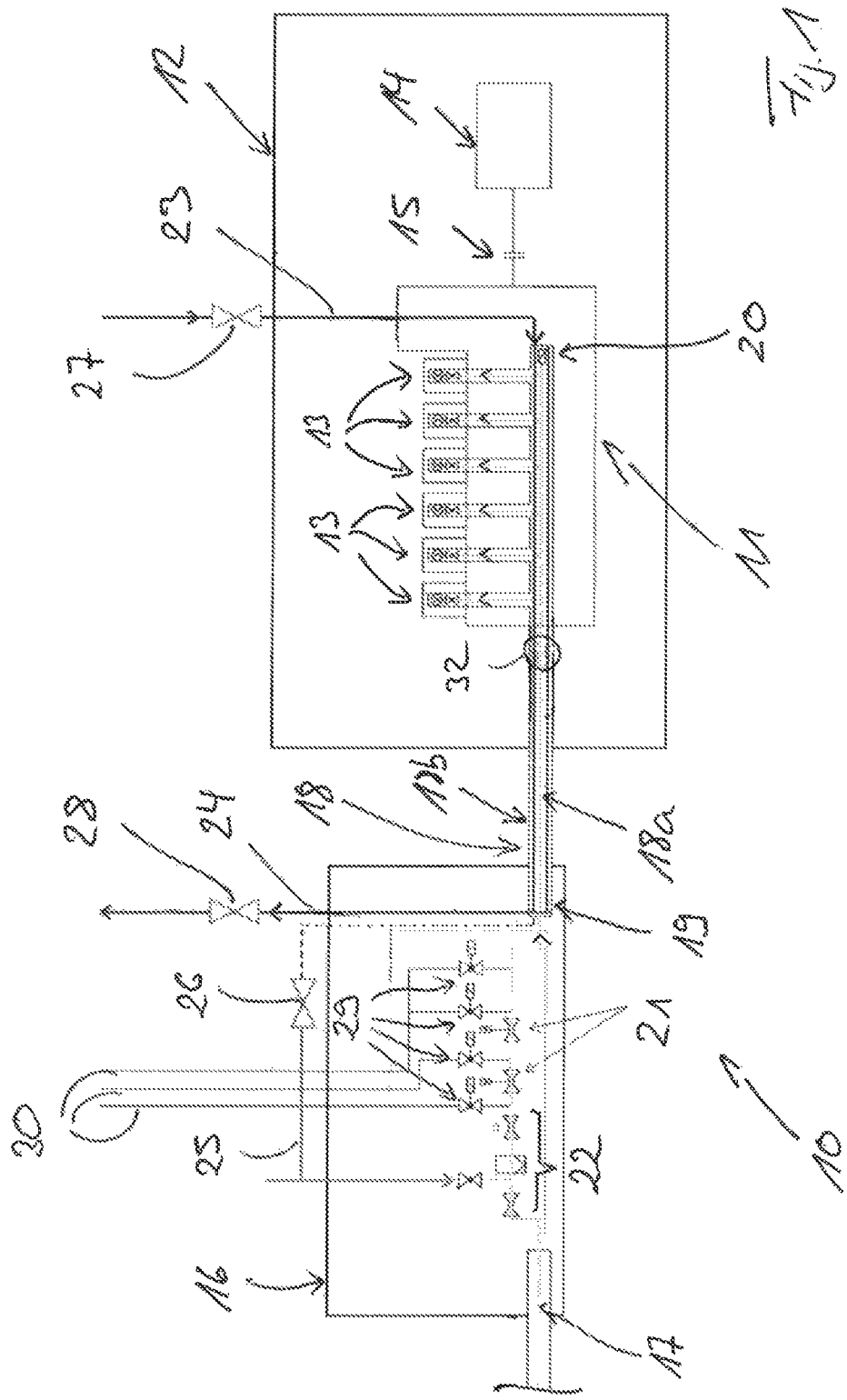
FIG. 1 is a gas supply system according to the invention for a gas engine or dual-fuel engine in a first state.

One aspect of the invention relates to a gas supply system for an engine designed as gas engine or dual-fuel engine, which is employed in particular on a ship. The invention, furthermore, relates to a method for operating such a gas supply system.

FIGS. 1 and 2 show an exemplary embodiment of a preferred gas supply system 10 in the sense of the invention present here together with an engine 11 designed as dual-fuel engine. The engine 11 is arranged in an engine room 12.

The engine 11 is designed as a dual-fuel engine or pure gas engine comprises multiple cylinders 13, in which in the gas fuel operating mode of the engine a gaseous fuel is combusted. In a liquid fuel operating mode, a liquid fuel, such as for example a diesel fuel, can be combusted in the cylinders 13 of the engine 11.

Furthermore, FIG. 1 shows a generator 14 arranged in the engine room 12, which can be coupled to the engine 11 via a clutch 15. With closed clutch 15, the generator 14 can be driven by the engine 11 in order to generate electric energy for example. The engine 11 can also be utilised to provide drive power at another output for example in a ship at a ship's propeller.

In the gas fuel operating mode, the cylinders 13 of the engine 11 are provided with the gaseous fuel via the gas supply system 10. The gas supply system 10 comprises a tank for providing the gaseous fuel which is not shown.

Furthermore, the gas supply system 10 comprises a gas regulating station, which is part of the previously mentioned GVU space 16. The gas regulating station 16 serves for supplying the engine 11 with gaseous fuel, namely with gaseous fuel of constant gas pressure as a function of a requested engine output.

FIG. 1 shows a gas line 17 which, emanating from the tank, which is not shown, extends in the direction of the engine 11, wherein this gas line 17 between the gas regulating station 16 and the engine 11 is part of a double-walled gas line 18. In the region of the double-walled gas line 18, the gas line 17 forms an inner pipe 18a of the double-walled gas line 18, wherein this inner pipe 18a of the double-walled gas line 18 is surrounded by an outer pipe 18b in sections.

The inner pipe 18a and the outer pipe 18b of the double-walled gas line 18 form flow passages that are separated from one another.

The double-walled gas line 18 comprises a gas regulating station-side end 19 and an engine-side end 20. In the gas fuel operating mode of the engine 11, the double-walled gas line is flowed through, emanating from the gas regulating station-side end 19, by gaseous fuel in the direction of the engine-side end 20, namely the inner pipe 18a of the double-walled gas line 18.

FIG. 1 shows gas shut-off valves 21 installed in the region of the gas regulating station 16. In particular when the engine 11 is operated in the gas fuel operating mode, these gas shut-off valves 21 are open. Seen in the flow direction of the gaseous fuel upstream of the gas shut-off valves 21, assemblies of a pressure regulator 22 are shown, via which the constant gas pressure of the gaseous fuel can be provided. Furthermore, FIG. 1 shows vent valves 29 installed in the region of the gas regulating station 16, which interact with vent lines 30.

In the gas supply system 10 shown in FIGS. 1 and 2 it is provided that in the gas fuel operating mode the outer pipe 18b of the double-walled gas line 18 for discharge any present gas leakage is flowed through by purge air, namely emanating from the engine-side end 20 in the direction of the gas regulating station-side end 19 of the double-walled gas line 18, so that accordingly in the gas fuel operating mode in the gas supply system 10 of FIGS. 1 and 2 the inner pipe 18a and the outer pipe 18b are flowed through in opposite directions. The purge air can be fed to the outer pipe 18b at the engine-side end 20 of the double-walled gas line 18, namely via a purge air supply line 23. The purge air can exit the double-walled gas line at the gas regulating station-side end 19 and be discharged via a purge air discharge line 24.

In the gas supply system 10 according to one aspect of the invention it is provided that an inert gas purging line 25 is present, namely with a first shut-off valve 26 assigned to the inert gas purging line 25. In particular when the purge air supply line 23 and the purge air discharge line 24 are present, a second shut-off valve 27, and a third shut-off valve 28 are assigned to the purge air supply line 23 and the purge air discharge line 24 respectively.

In the gas fuel operating mode, the second shut-off valve 27 and the third shut-off valve 28 are both open, while the first shut-off valve 26 by contrast is closed in the gas fuel operating mode. In particular when there is no gas fuel operating mode of the engine 10, but rather a purging operation, in order for example to change over the dual-fuel engine from the gas fuel operating mode to the liquid fuel operating mode, the first shut-off valve 26 is open so that inert gas can then be fed via the inert gas purging line 25 to the outer pipe 18b of the double-walled gas line 18 at the gas regulating station-side end 19 of the double-walled gas line 18, which inert gas flows through the outer pipe 18b in the direction of the engine-side end 20 of the double-walled gas line 18, there passes from the outer pipe 18b into the inner pipe 18a and flows via the inner pipe 18a back in the direction of the gas regulating station-side end 19 of the double-walled gas line 18 in order to, there, exit the same or in order to be discharged, there, via the venting device 29, 30. In particular when the purge air supply line 23 and the purge air discharge line 24 are present, the second shut-off valve 27 and the third shut-off valve 28 are then both closed in the purging mode. Likewise, the two gas shut-off valves 21 are closed in the purging mode.

As described above, the two gas shut-off valves 21 are present in the region of the gas regulating station 16. The multiple vent valves 29 are likewise present, wherein in the shown exemplary embodiment two vent valves 29 are assigned to a vent line 30, which between the or each gas shut-off valve 21 and the gas regulating station-side end 19 of the double-walled gas line 18, branches off of the gas line 17.

As explained above, the gas shut-off valves 21 are closed in the purging mode while the vent valves 29 by contrast, which are assigned to the vent lines 30, which branches off of the gas line 17 between the gas shut-off valves 21 and the gas regulating station-side end 19 of the double-walled gas line 18, are open in the purging mode of the engine 11, so that the inert gas then exiting from that gas regulating station-side end of the double-walled gas line 18, namely from the inner pipe 18a of the same, can be discharged via the vent line 30.

In particular when, as shown in FIG. 1, the engine 11 is operated in the gas mode, the first shut-off valve 26 is closed and no inert gas is conducted to the engine 11. The gas shut-off valves 21 are open so that via the double-walled gas line 18, via the inner pipe 18a, gaseous fuel can be fed to the cylinders 13 of the engine 11.

In particular when, in the gas fuel operating mode, the outer pipe 18b is purged with purge air, the two shut-off valves 27 and 28 are open, so that via the purge air supply line 23 the purge air, at the engine-side end 20, can be fed to the double-walled gas line 18, namely the outer pipe 18b and that the purge air, which at the gas regulating station-side end 19 of the double-walled gas line 18 exits the same, namely the outer pipe 18b, can be conducted via the purge air discharge line 24. In the gas fuel operating mode, the vent valves 29 are closed.

In the purging mode, the first shut-off valve 26 is opened, the second shut-off valve 27 and the third shut-off valve 28 are both closed. The gas shut-off valves 21 are also closed. At least one of the vent valves 29, which is assigned to the vent lines 30, which branches off of the gas line 17 between the gas shut-off valves 21 and the gas regulating station-side end 19 of the double-walled gas line 18a is open.

Accordingly, inert gas can then be fed in the purging mode with opened shut-off valve 26 to the outer pipe 18b via the gas regulating station-side end 19 of the double-walled gas line 18, wherein the inert gas then flows via the outer pipe 18b in the direction of the engine-side end 20 of the double-walled gas line 18 where it passes into the inner pipe 18a. In the inner pipe 18a, the inert gas flows from the engine-side end 20 back to the gas regulating station-side end 19 of the double-walled gas line 18 where it exits from the double-walled gas line 18 and is discharged via the vent line 30, which seen in the flow direction of the inert gas branches off of the gas line 17 upstream of the gas shut-off valves 21.

As is evident from the detail III of FIG. 3, a valve 31 is provided at the engine-side end 20 of the double-walled gas line 18, which in the purging mode permits the passage of the inert gas from the outer pipe 18b of the double-walled gas line 18 into the inner pipe 18a of the double-walled gas line. In the shown exemplary embodiment, this valve 31 is a non-return valve. In particular when in the gas fuel operating mode the inner pipe 18a is flowed through by the gaseous fuel in the opposite direction, the non-return valve 31 is closed.

A switchable valve can also be employed as valve 31. However, a non-return valve is easier in terms of design.

The double-walled gas line 18 can be assigned a pressure sensor 32 to measure the pressure in the double-walled gas line 18, especially in the outer pipe 18b. This can serve in particular when in the purging mode the double-walled gas line 18 is filled with inert gas both in the inner pipe 18a and also in the outer pipe 18b, for closing the first shut-off valve 26 and then monitoring the pressure in the double-walled gas line 18. When a pressure drop is detected, a leakage on the double-walled gas line 18 can be concluded. This functionality requires as prerequisite a switchable valve as valve 31. Valve 31 has to be closed before valve 26. A pressure drop is then monitored in 18b.

Although in FIGS. 1 and 2 the purge air supply line 23 and the purge air discharge line 24 is shown with the two shut-off valves 27 and 28, these assemblies can also be done without. In this case, the outer pipe 18b can then be filled with inert gas in the gas fuel operating mode. The pressure of the inert gas in the outer pipe 18b is then higher than the pressure of the gaseous fuel in the inner pipe 18a. By way of this, a particularly simple construction of the gas supply system 10 can be ensured by omitting the purge air supply line 23 and the purge air discharge line 24. The outer pipe 18b is then permanently filled with inert gas. This can then be utilised in the purging mode for example when changing on a dual-fuel engine from the gas fuel operating mode into the liquid fuel operating mode, for purging the inner pipe 18a.

Furthermore, one aspect of the invention relates to a method for operating a gas supply system 10, wherein it is provided that in the gas fuel operating mode the shut-off valve 26 is closed and in the purging mode the shut-off valve 26 is open. When the purge air supply line 23 and the purge air discharge line 24 are present, both shut-off valves 27 and 28 are open in the gas fuel operating mode and both are each closed in the purging mode.

In particular when in the purging mode of the engine 11 no gaseous fuel is combusted in the engine and the two gas shut-off valves 21 are closed, and when, furthermore, the double-walled gas line 18 has been filled with inert gas by opening the shut-off valve 26, the first shut-off valve 26 can be closed and then the pressure in the double-walled gas line 18 monitored with a pressure sensor 32, wherein upon a pressure change a leakage of the double-walled gas line can then be concluded.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A gas supply system for an engine having cylinders that is designed as a gas engine or a dual fuel engine, comprising:
  a gas regulating station configured to supply the engine in a gas fuel operating mode with a gaseous fuel of constant gas pressure as a function of a requested engine output;
  a double-walled gas line extending from the gas regulating station to the cylinders, which comprises:
    an inner pipe having an uninterrupted surface with outlets only at its axial ends;
    an outer pipe having an unobstructed interior space defined by an outer surface of the inner pipe and an inner surface of the outer pipe, which surrounds the inner pipe at least in sections so that the inner pipe is separated from the outer pipe; and
    a check valve, only in the inner pipe, provided at the engine-side end radially within the double-walled gas line that is configured to provide a flow towards at least one vent line,
  wherein in the gas fuel operating mode of the double-walled gas line, emanating from a gas regulating station-side end of the double-walled gas line, the outer pipe can be flowed through by the gaseous fuel towards an engine-side end of the double-walled gas line,
  an inert gas purging line;
  a first shut-off valve connected to the inert gas purging line,
  wherein in a purging mode of the engine, with the first shut-off valve in an opened state, an inert gas can be fed via the inert gas purging line to the outer pipe of the double-walled gas line at the gas regulating station-side end of the double-walled gas line, the inert gas flows through the outer pipe towards an engine-side end of the double-walled gas line, where the inert gas passes into the inner pipe and, via the inner pipe, flows back towards the gas regulating station-side end of the double-walled gas line where the inert gas then exits.

2. The gas supply system according to claim 1, wherein with the first shut-off valve in a closed state the engine is supplied with gaseous fuel.

3. The gas supply system according to claim 1, further comprising:
a gas line extends in a region of the gas regulating station towards the gas regulating station-side end of the double-walled gas line;
at least one gas shut-off valve is integrated in the gas line;
wherein the gas line merges into the inner pipe of the double-walled gas line or provides the double-walled gas line;
the at least one vent line with a vent valve integrated in the at least one vent line branches off the gas line in a region between the at least one gas shut-off valve and the gas regulating station-side end of the double-walled gas line;
wherein when the vent valve is in an open state and the gas shut-off valve is in a closed state the inert gas exiting from the double-walled gas line at the gas regulating station-side end in a purging mode of the engine is discharged via the at least one vent line.

4. The gas supply system according to claim 3, wherein the check valve, in the purging mode, permits a passage of the inert gas from the outer pipe of the double-walled gas line into the inner pipe of the double-walled gas line.

5. The gas supply system according to claim 1, further comprising:
a pressure sensor connected to the double-walled gas line, configured to detect a pressure drop of the double-walled gas line filled with the inert gas.

6. The gas supply system according to claim 1, wherein the outer pipe of the double-walled gas line in the gas fuel operating mode of the engine can be flowed through by purging in towards the gas regulating station for discharging a gas leakage,
the gas supply system further comprising:
a purge air supply line configured to feed purge air to the outer pipe at the engine-side end of the double-walled gas line;
a purge air discharge line configured to discharge the purge air from the outer pipe at the gas regulating station-side end of the double-walled gas line;
a second shut-off valve assigned to the purge air supply line; and
a third shut-off valve assigned to the purge air discharge line,
wherein the second and third shut-off valves are closed in the purging mode of the engine and open in the gas fuel operating mode of the engine.

7. The gas supply system according to claim 6, wherein when in the gas fuel operating mode of the engine gaseous fuel is combusted in the engine, the first shut-off valve is closed and the second and third shut-off valves are open.

8. The gas supply system according to claim 6, wherein when in a purging mode of the engine no gaseous fuel is combusted in the engine, and in a dual-fuel engine for a transition to a liquid fuel operating mode of the engine, the first shut-off valve is open and the second and third shut-off valves are closed.

9. The gas supply system according to claim 6, wherein when in the purging mode of the engine no gaseous fuel is combusted in the engine, and in a dual-fuel engine for a transfer into a liquid fuel operating mode of the engine, the double-walled gas line is filled with inert gas, the first shut-off valve is then closed and a pressure in the double-walled gas line then monitored via a pressure sensor.

10. A method for operating a gas supply system for an engine having cylinders that is designed as a gas engine or a dual fuel engine having:
supplying, via a gas regulating station the engine in a gas fuel operating mode with a gaseous fuel of constant gas pressure as a function of a requested engine output;
coupling the gas regulating station to the cylinders via a double-walled gas line the double-walled gas line comprises:
an inner pipe having an uninterrupted surface with outlets only at its axial ends;
an outer pipe having an unobstructed interior space defined by an outer surface of the inner pipe and an inner surface of the outer pipe, which surrounds the inner pipe at least in sections so that the inner pipe is separated from the outer pipe; and
a check valve, only in the inner pipe, provided at the engine-side end radially within the double-walled gas line that is configured to provide a flow towards at least one vent line,
wherein in the gas fuel operating mode of the double-walled gas line, emanating from a gas regulating station-side end of the double-walled gas line:
flowing the gaseous fuel through the outer pipe in the direction of an engine-side end of the double-walled gas line,
an inert gas purging line;
a first shut-off valve connected to the inert gas purging line,
wherein in a purging mode of the engine: with
opening the first shut-off valve in an opened state,
feeding inert gas via the inert gas purging line to the outer pipe of the double-walled gas line at the gas regulating station-side end of the double-walled gas line,
flowing the inert gas through the outer pipe towards an engine-side end of the double-walled gas line, where the inert gas passes into the inner pipe and, via the inner pipe, flows back towards the gas regulating station-side end of the double-walled gas line where the inert gas then exits;
the outer pipe of the double-walled gas line in the gas fuel operating mode of the engine can be flowed through by purging in the direction of the gas regulating station for discharging a gas leakage,
the gas supply system further comprising:
feeding via a purge air supply line, purge air to the outer pipe at the engine-side end of the double-walled gas line;
discharging via a purge air discharge line, purge air from the outer pipe at the gas regulating station-side end of the double-walled gas line;
a second shut-off valve assigned to the purge air supply line; and
a third shut-off valve assigned to the purge air discharge line,
closing the first shut-off valve is closed and opening the second and third shut-off valve wherein gaseous fuel is combusted in the engine in the gas fuel operating mode.

11. The method for operating a gas supply system according to claim 10, wherein when in the purging mode of the engine no gaseous fuel is combusted in the engine, and in a dual-fuel engine for a transition to a liquid fuel operating mode of the engine, the first shut-off valve is open and the second and third shut-off valve are closed.

12. The method for operating a gas supply system according to claim 11, wherein when in the purging mode of the engine no gaseous fuel is combusted in the engine, and in a dual-fuel engine for a transfer into a liquid fuel operating mode of the engine, the double-walled gas line is filled with inert gas, the first shut-off valve is then closed and a pressure in the double-walled gas line then monitored via a pressure sensor.

* * * * *